E. & W. H. TAYLOR.
METHOD OF GENERATING AND UTILIZING MOTIVE FLUIDS.
APPLICATION FILED JUNE 17, 1912.
1,241,781.
Patented Oct. 2, 1917.
6 SHEETS—SHEET 1.
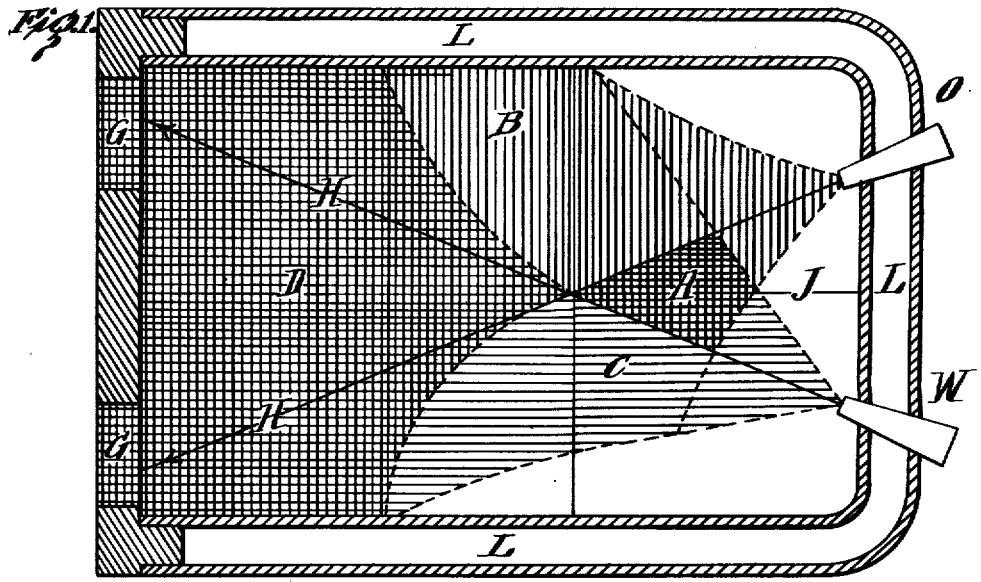
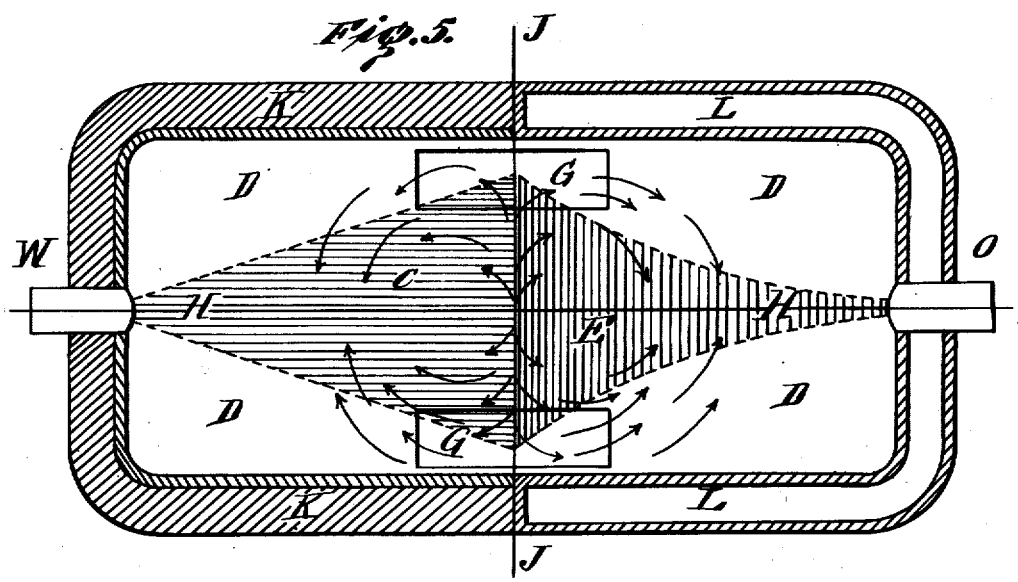

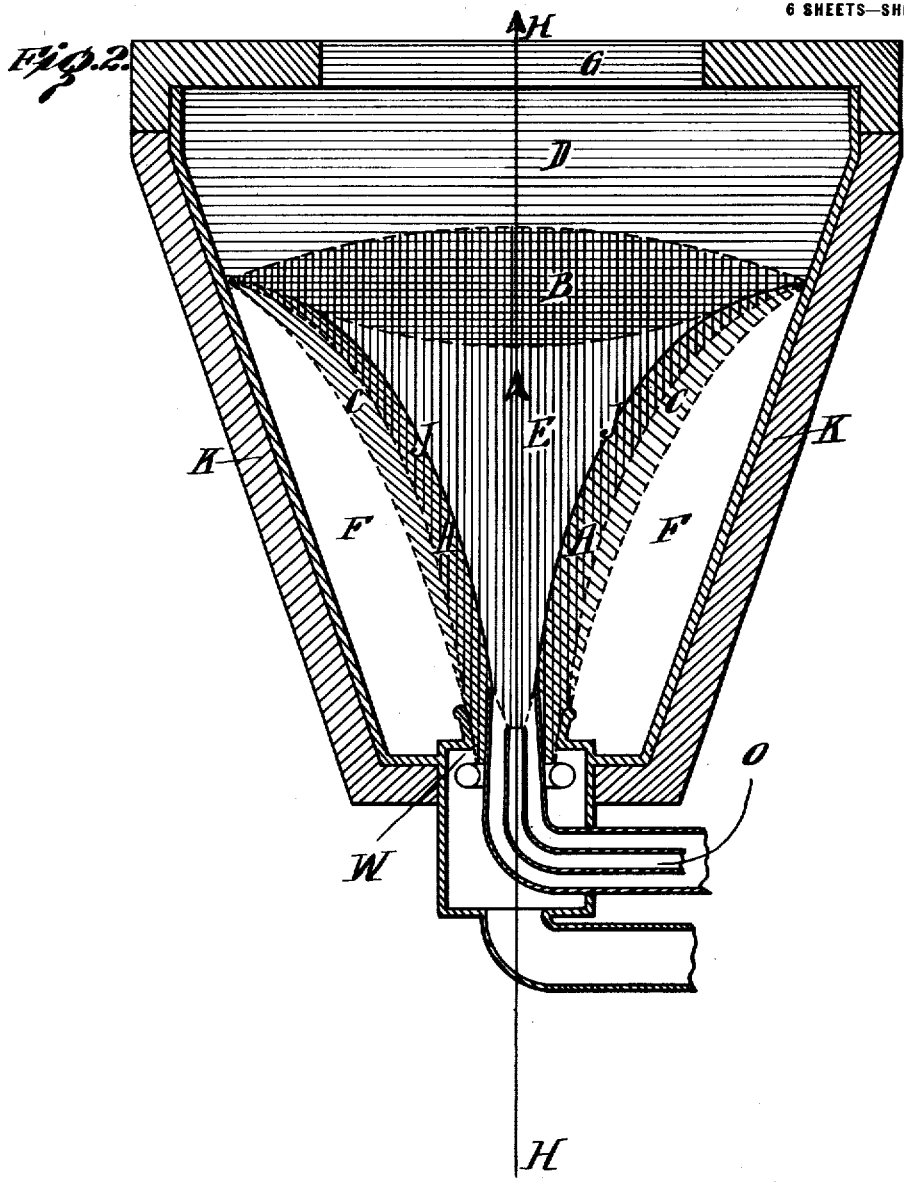

E. & W. H. TAYLOR.
METHOD OF GENERATING AND UTILIZING MOTIVE FLUIDS.
APPLICATION FILED JUNE 17, 1912.
1,241,781.
Patented Oct. 2, 1917.
6 SHEETS—SHEET 3.
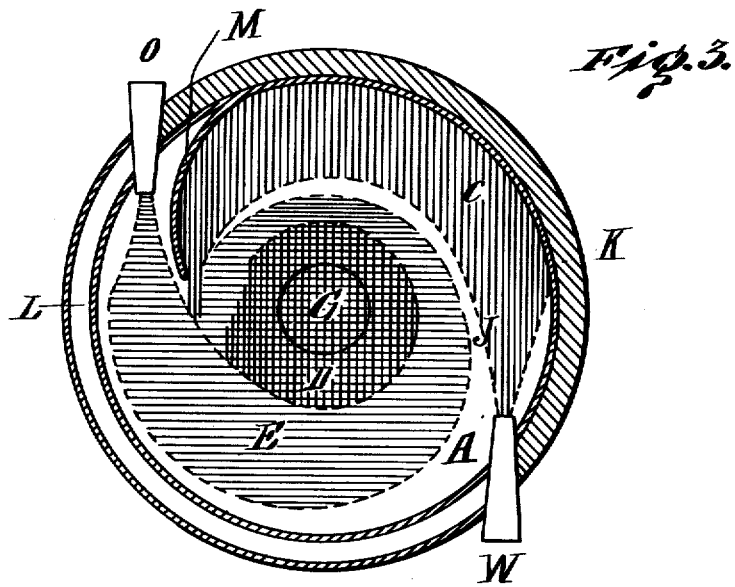
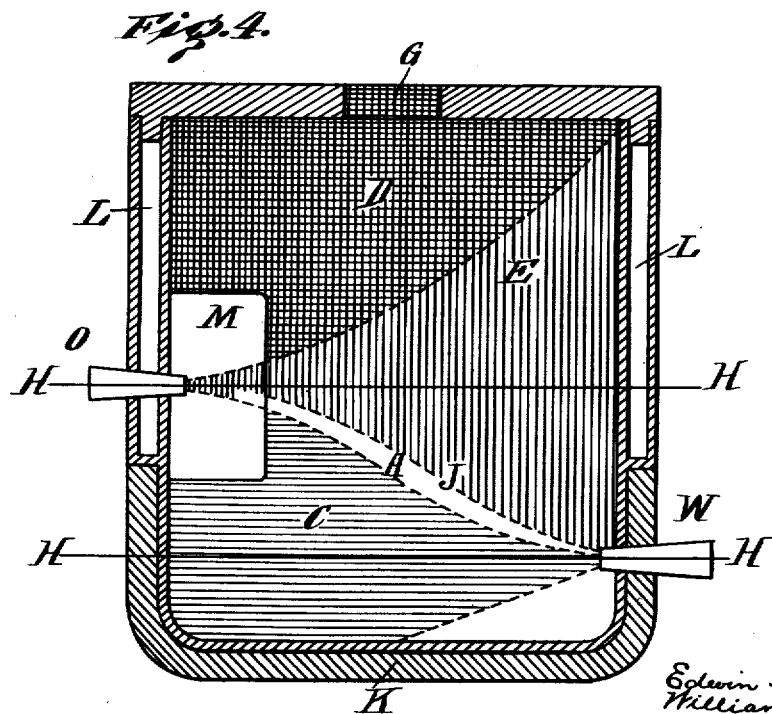

E. & W. H. TAYLOR.
METHOD OF GENERATING AND UTILIZING MOTIVE FLUIDS.
APPLICATION FILED JUNE 17, 1912.
1,241,781.
Patented Oct. 2, 1917.
6 SHEETS—SHEET 4.
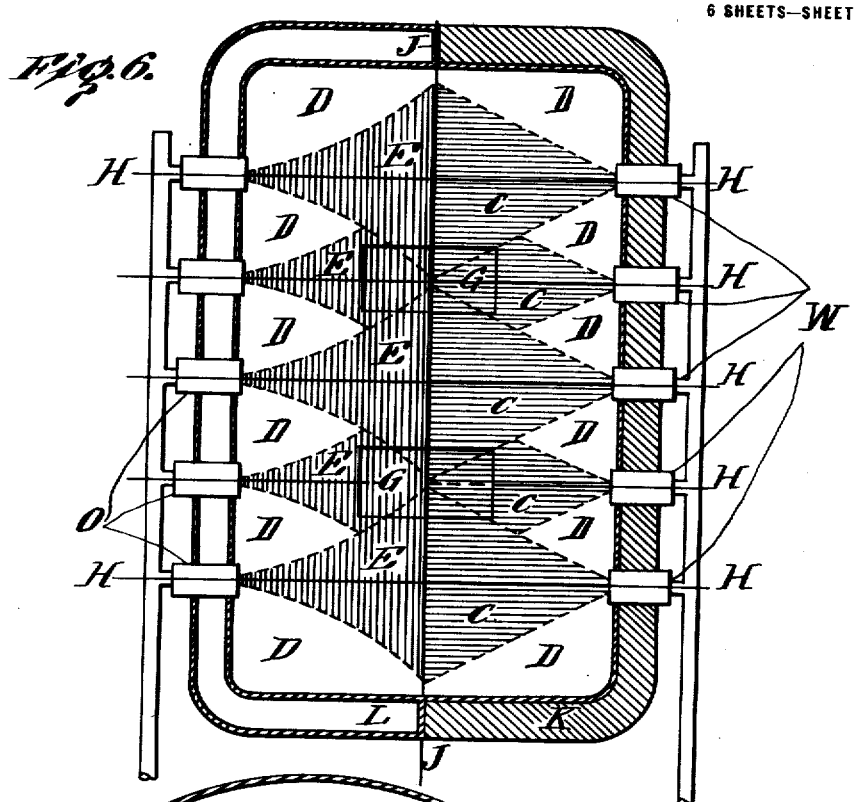
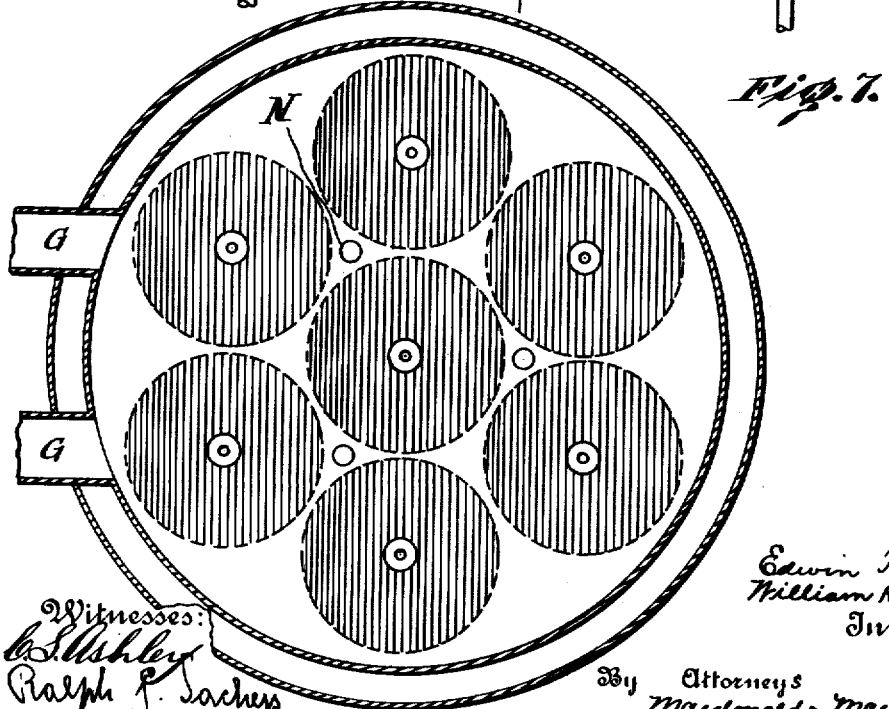

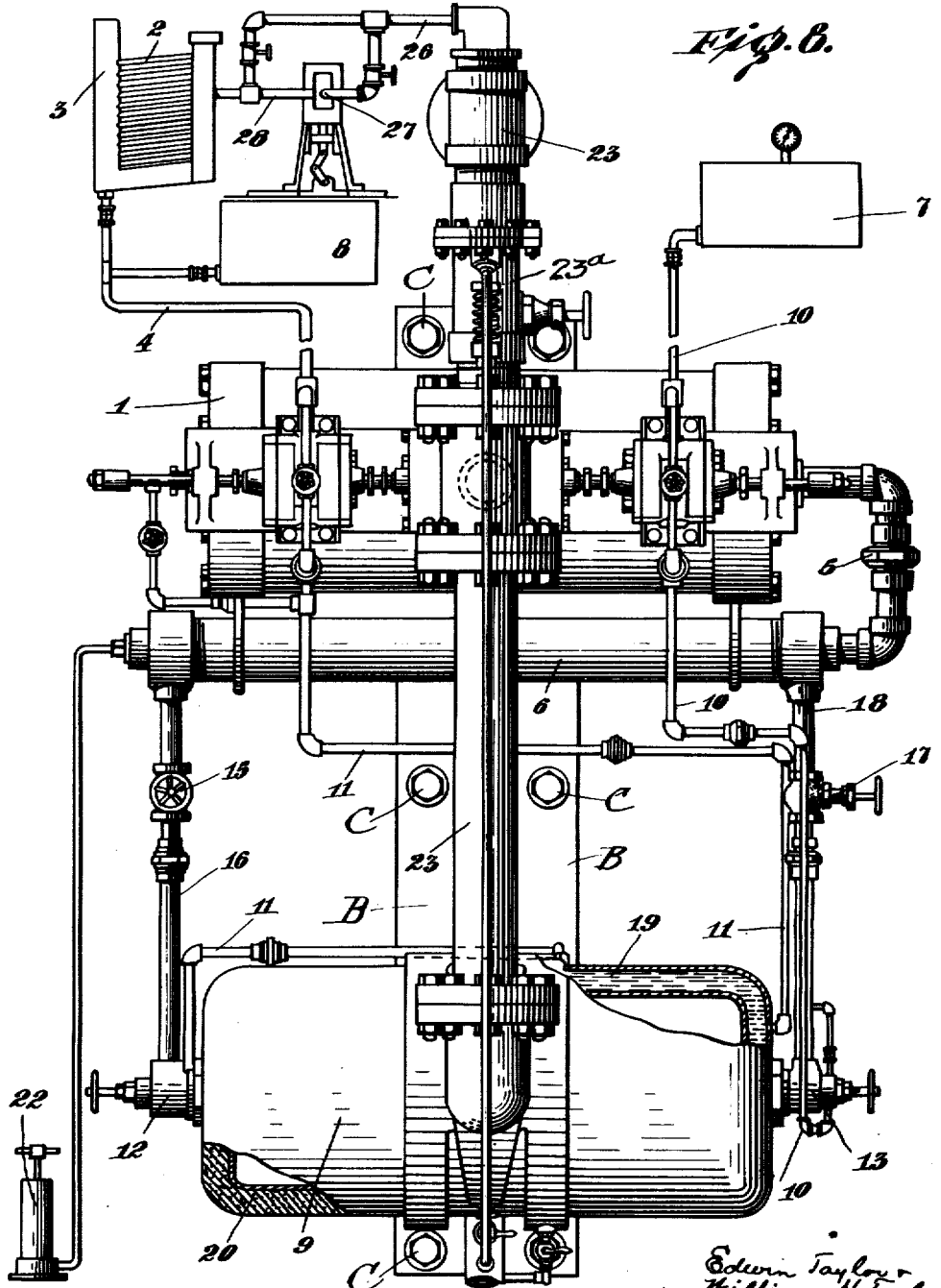

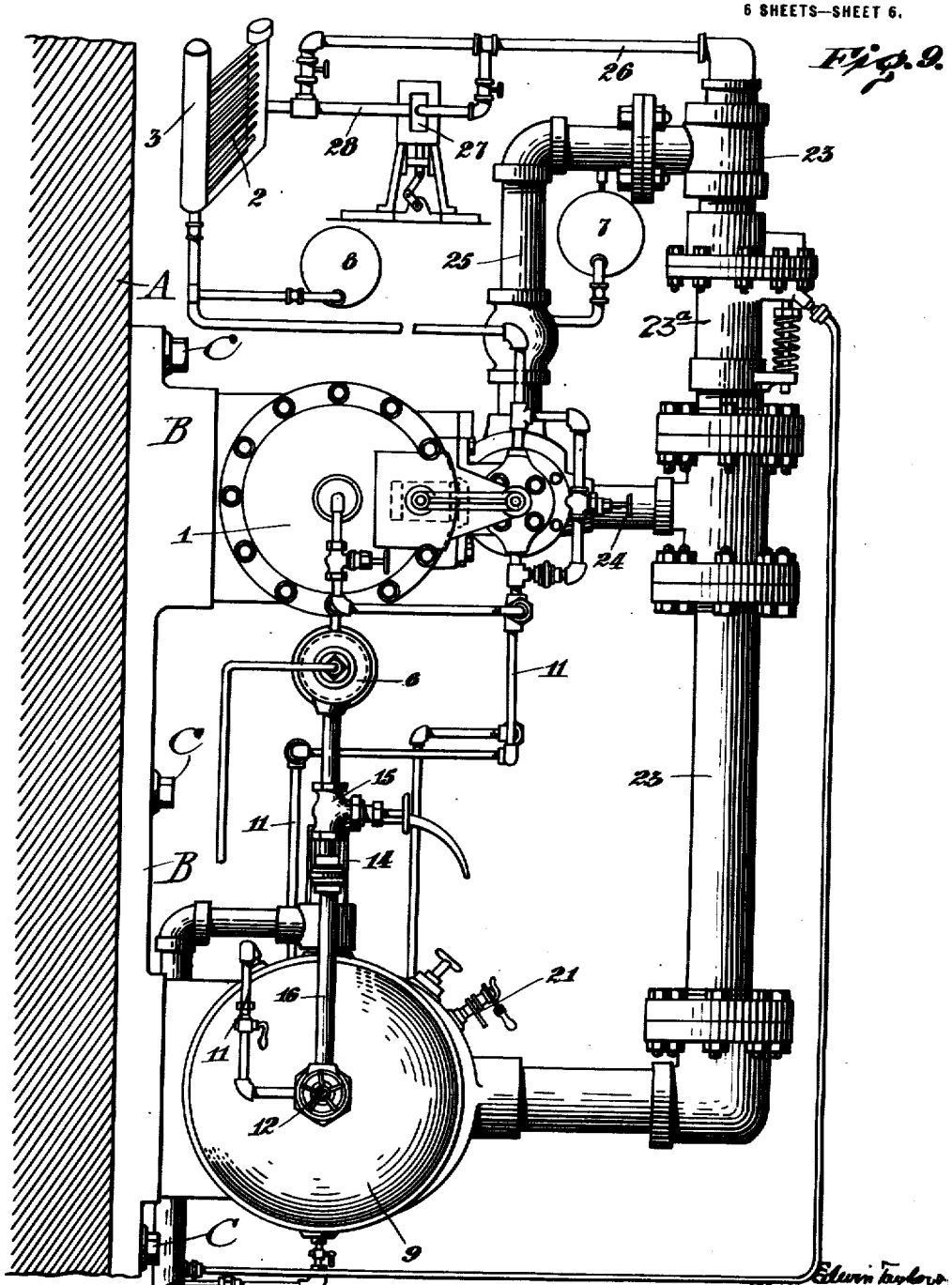

UNITED STATES PATENT OFFICE.

EDWIN TAYLOR AND WILLIAM H. TAYLOR, OF NEW YORK, N. Y., ASSIGNORS, BY MESNE ASSIGNMENTS, TO TAYLOR-HUBBARD COMPANY, A CORPORATION OF NEW YORK.

METHOD OF GENERATING AND UTILIZING MOTIVE FLUIDS.

1,241,781.   Specification of Letters Patent.   Patented Oct. 2, 1917.

Application filed June 17, 1912. Serial No. 704,055.

*To all whom it may concern:*

Be it known that we, EDWIN TAYLOR and WILLIAM H. TAYLOR, citizens of the United States, and residents of the city of New York, in the county of New York and State of New York, have invented certain new and useful Improvements in Methods of Generating and Utilizing Motive Fluids, of which the following is a specification.

One of the chief problems in modern technics is the generation of power with an economic use of fuel and as small as possible waste of heat. This waste exists in steam as well as hydrocarbon engine practice. It is a well known fact that not more than twelve per cent. of the cost of fuel is converted into actual work. Numerous efforts have been made to find a substitute for coal or for the more expensive hydrocarbons, and crude petroleum, particularly Mexican oil, has been suggested, without, however, having ever been utilized for the production of motive fluid to any considerable extent.

The principal object of the present invention is to provide a method of generating motive fluids from hydrocarbons, whereby the loss in heat efficiency, heretofore experienced, is greatly reduced, it being well known that by prior methods and apparatus, the major portion of the products of combustion of the combustible materials used, are drawn up the stack or otherwise lost, without performing any mechanical work.

Another object of this invention is to provide a method whereby it is possible to utilize a relatively low grade, and consequently low priced, fuel, such as crude petroleum or Mexican oil, which is rich in tarry substances, and has heretofore been regarded as nearly incapable of being used for power generating purposes. Such oils may be used either alone or in the presence of other fuel, such as coal.

It is another object of this invention to increase the effective utility of the products of combustion of carbonaceous materials, simply for heating purposes or, expansively or otherwise, for doing work in a prime mover.

Another object of this invention is the saving and using over of the products of combustion, for example, the water produced by the combustion of liquid hydrocarbons.

The invention has been embodied in an apparatus for generating and utilizing motive fluids for which application for U. S. Letters Patent has been made, Serial No. 653,608 filed October 9, 1911, and the methods used therein and forming the subject-matter of the present application, are illustrated in the accompanying drawings, in which,—

Figure 1 is a diagrammatic view of the action of a fuel jet and a water jet, contacting at an acute angle, Fig. 2 is a similar view of the action of the jets, arranged concentrically to each other and coaxially to the generating chamber, Figs. 3 and 4 are similar views, at right angles to each other, respectively, of the action of the jets, arranged tangentially to the axis of the generating chamber, Fig. 5 is a similar view of the action of the jets arranged coaxially opposing each other and representing the preferred form of the present invention.

Fig. 6 is a similar view of the action of a plurality of jets, arranged analogous to Fig. 5, Fig. 7 is a cross sectional view of Fig. 6 in the plane of impact of the jets, Fig. 8 is a front elevation, partly diagrammatic, of an apparatus embodying the present invention, and Fig. 9 is a side elevation of the apparatus shown in Fig. 8.

The method of generating a motive fluid to accomplish the objects of the present invention consists in projecting a jet of inflammable material in a state of ignition into a suitable space, and mixing it therein with air, water or other oxygen-bearing fluids. The projection of the jet of inflammable material takes place in the form of a heat-generating cone which contacts with or is opposed by a similar cone of oxygen-bearing material, forming a heat-absorbing cone. The projection of these cones into a confined space results in an approximate plane of contact or impact, and, in its preferred form, when the projecting cones are coaxially opposing each other, in a plane of impact substantially at right angles to the axes and approximately midway between the apices of the cones and preferably of a diameter less than that of the confined space.

The products of combustion escape from the confined space through suitable openings with a swirling movement causing a complete mixture, of uniform temperature, of the different gaseous substances. The apparatus used in carrying out the methods of the present invention are instrumental in obtaining a series of cycles that ultimately result in motive power and comprise, in constant rotation and the same sequence, first, ignition, second, combustion, third, expansion, fourth, propulsion, fifth, exhaust and sixth, condensation.

The effective use of this series of cycles results in the utilization of the so far highest percentage of heat units from the fuel used, including all those from the gaseous products of combustion as well as the aqueous vapor produced by combustion. The products resulting from the contact of the heat-generating jet and the heat absorbing jet form a uniformly mixed compound fluid of any desired temperature and pressure which, expansively or otherwise, can be used in prime movers, such as steam engines or other motors. The pressures and temperatures of the fluids depend upon the relative proportions of the heat-generating and heat-absorbing jets and can be varied by either diminishing the heat-generating jet and holding the heat-absorbing jet constant or vice versa.

The form and size of the injecting nozzles is of prime importance and they should preferably be dissimilar. The tendency to expand of the products of combustion of the heat-generating jet is different from that of the heat-absorbing jet and this results in the formation of a circle of larger diameter at any given distance from the nozzle of the heat-generating jet than that formed by the opposing heat-absorbing jet at an equal distance. It is important, therefore, that the areas of the opposing cones at the plane of impact should be circles of the same diameter.

For the generation of large powers, however, a plurality of opposed jets may be used, the axes of which should be parallel. The opposing cones are so spaced apart that their planes of impact are equal and equidistant from the jets and the sum of the diameter of the planes of impact, smaller than the diameter of the generating chamber. While the preferred arrangement consists in having all heat-generating cones located on one side of the chamber and the heat-absorbing cones on the opposite side, they may also be arranged by having part of the heat-generating and heat-absorbing cones on one side and a similar arrangement on the opposite side.

A variety of fuels, such as gas, oil, crude petroleum, chemicals, powered carbon, &c., may be employed for the heat-generating cone, while water or various chemicals, such as sulfuric acid, &c., or other hydrogenous materials may be employed in the heat-absorbing cone. The necessary oxygen may be taken from the atmosphere or furnished by introducing various oxygen-producing compounds.

As already stated hereinbefore, while the use of an air and fuel jet, supplemented by a jet of water, is old in the art, the use of a fuel jet and water jet in a confined space and so arranged that the products of combustion of the fuel jet are opposed by the water jet, and the mixed products permitted to escape from the generating space at a uniform temperature and with a swirling motion, to be subsequently expanded in an engine cylinder, is thought to be broadly new and forms the essence of generating motive fluid from fuel, according to the present invention. The use of crude petroleum, such as Mexican oil, containing a large percentage of tarry matter, is one of the particular advantages obtained by these methods.

It has been found that the rate of combustion of oil is directly dependent upon the pressure in the generating chamber, and that a particle of oil, too large to burn completely under atmospheric pressure, will burn completely under pressure greater than atmospheric. For instance, a particle of oil of certain volume, under one hundred pounds pressure, will be burned in about one-third of the time required for burning a similar particle in the open air.

In applying this principle to engine practice, it has been found that when these oils are burned directly in an engine cylinder, the deposition of tar, &c., as solid matter is increased owing to the cold walls with which the oil is in contact before combustion is complete. This obviously causes gumming and sticking of the pistons and finally stoppage of the engine. In the present method of utilizing oils, this deposition of tarry matter is practically eliminated, owing to the high rate and perfection of combustion, so that only a small amount of solid tarry substance is formed, which is prevented from adhering to the cylinder walls, by the large volume of aqueous vapor and is washed off as rapidly as it is formed.

The theory of the action of fuel and water, as used in the present invention, is comprehensively illustrated in the drawings, Figs. 1 to 7.

O indicates the heat-generating jet.
W indicates the heat-absorbing-jet.

B represents the zone of partial mixture and high super-heat.

C represents the zone of aqueous vapor, partially heated by radiant heat, which heat increases toward the zone D.

D represents the zone of mixture and expansion and the products of combustion in this zone have developed a swirling or rotary motion.

E represents the zone of complete combustion at a maximum temperature.

F represents the zone of inactive gas and vapor,

G are the outlet orifices,

H the axes of direction of the jets,

J the plane of impact,

K the insulating jacket, and

L the water jacket.

In Fig. 1 of the drawings, the heat-generating jet approaches the heat-absorbing jet at an acute angle and it is obvious that the products of combustion of the heat-generating jet are considerably cooled on the side of impact with the heat-absorbing jet and, therefore, produce incomplete combustion throughout the plane of impact. As it were, the oil particles of the heat-generating jet are met and extinguished by an overwhelming amount of water before their combustion. This results obviously in the formation of large amounts of carbon monoxid $CO$ instead of carbon dioxid $CO_2$, the product of complete combustion. The sudden cooling of the hydrocarbon flame of the heat-generating jet, causes also the formation of large amounts of soot. The temperature at the plane of impact of flame and water, however, is apparently still sufficient to disassociate the oxygen and hydrogen of the water, causing, therefore, a consequent absorption of heat. It is doubtful whether this heat so absorbed is subsequently again released, inasmuch as the oxygen and hydrogen so produced are rapidly cooled by the incoming heat-absorbing jet and may never become hot enough to again confine and again liberate the absorbed heat.

Fig. 2 illustrates the action of jets arranged coaxially and concentrically and, since the heat-absorbing jet completely surrounds the heat-generating jet, it is obvious that this entire form should be completely insulated, as indicated at K, to "confine" the heat, instead of being water-jacketed to "lead off" the heat.

Figs. 3 and 4, illustrating tangentially arranged jets show that the swirling motion of the gases and vapors begins almost on leaving the jets. The heat loss in this arrangement is greater than that of the arrangement shown in Fig. 1, on account of the burning gases being in contact with the cold walls of the generator and the entering water for a longer time and greater distance. The compartment, therefore, is preferably insulated as shown at K. A baffle plate M may be employed to prevent the extinguishing of the heat-generating jet O, by means of the heat-absorbing jet.

Fig. 5 illustrates the preferred form of the present invention, in which the heat-generating jet is coaxially opposed by the heat-absorbing jet. One of the distinctive features of this arrangement is the absence of the zone A, i. e. the zone of incomplete combustion and heat loss.

In the present method, the heat-generating material and the heat-absorbing material are driven through their orifices and into impact with one another by compressed air, exerting a constant pressure and carrying the fuel and water to the jets and mixing and atomizing the same there, to form a properly combustible mixture and a properly expansive vapor, each developed into a cone projected into the chamber until they meet in the plane of impact.

In this form the heat-generating and heat-absorbing jets or fuel jet and water jet, as they may be called, enter the confined space or combustion chamber coaxially from opposite points. The orifices or nozzles are so designed that the burning hydrocarbons and the spray of water, are opposing each other in the shape of cones, in which the plane of impact formed by the basis of the cones, is approximately circular and located at or near the center of the generating chamber. As heretofore stated, the diameter of the area of impact can obviously be regulated by the force of the entering jets and should preferably be smaller than the diameter of the chamber, so as to leave a space filled with superheated vapor and gas, between the cones and the walls of the combustion chamber. This arrangement prevents considerably the loss of heat by radiation or by the contact of the products of combustion with the walls of the generating chamber.

An important element in the arrangement shown in Fig. 5 is the angle of dispersion of the jets. As stated before, the diameter of the area of impact, should always be less than that of the generating chamber, so as to permit the products of combustion to assume a swirling or rotary movement at the periphery of the plane of impact and to cause these vapors to become practically of a uniform mixture and temperature before they escape through the orifices G to the point of utilization.

Fig. 5 also illustrates the advantage of employing dissimilar nozzles for the entering jets. This is necessitated by the fact that the heat generating jet, emanating from the nozzle O, expands adiabatically, while the heat absorbing jet, emanating from the nozzle W, expands uniformly. The heat-generating cone, therefore, should have a smaller angle of entrance than the heat-absorbing cone. This arrangement results in perfect and uniform combustion, inasmuch as all of the products have an equal amount of time and distance in which to complete their burning and are not subjected to extreme outside cooling effects, before they reach the plane of impact. The presence of a volume of super-heated vapors and gases, swirling around the cone of the heat-absorbing jet within the walls of the generating chamber, prevents the depositing on the walls thereof, of aqueous vapor and the flooding by water of the bottom of the chamber.

The products of combustion, however, forming the cone E of the heat-generating jet, are prevented from coming in contact with the walls of the generator by a volume D of super-heated gases and vapors which tends to insulate the cone E from the walls of the generator and thus permits a maximum heating and combustion in the cone and a minimum loss by radiation through the generator walls. This heat loss is still further reduced by means of the water jacket L, surrounding that part of the generating chamber which incloses the heat-generating jet, and the heat that passes through the generator walls, is absorbed by the water jacket and returned to the chamber through the heat-absorbing jet W.

It is thought to be radically new in the art, to water-jacket the side of the generating chamber, surrounding the heat-generating cone, making the same thereby impervious to the effects of high heat, insulating the sides of the generator at the opposite end and then returning, both the heat and the water, to the generating chamber by means of the heat-absorbing cone. The side of the generating chamber, surrounding the heat-absorbing cone, is insulated as at K, to prevent the gases swirling around this cone, to become unduly cooled by contact with the generator walls. It must be evident that the heat effect on the side of the chamber, which surrounds the heat-generating cone, must be far greater than that on the side of the heat-absorbing cone, therefore, the water jacket L is provided on one side and the insulation K on the other.

Figs. 6 and 7 are analogous in arrangement to Fig. 5, except that a plurality of jets are provided, increasing the capacity of the device enormously. This arrangement has the additional advantage that the pressure and volume of the issuing gases and vapors can be controlled by igniting or extinguishing any desired number of the same, and observation ports W (Fig. 7), are provided, so that the internal conditions of the generating chamber may be readily observed and the operation of each individual nozzle controlled at will.

It is a well known fact that air may be compressed adiabatically or isothermally, but neither of these methods is used exclusively in the devices for carrying out the present invention, but rather an intermediate method, in which the water to be supplied to the air compressor, is carried directly to the valve of the same and there atomized by the incoming air and held suspended in the compressing chamber to absorb the heat of compression, as it develops. This heated water thereafter is ejected in a state of steam, together with the issuing air, and the portion that remains fluid or condenses in transit, is led to the water jacket of the generator while that which remains as vapor, enters the jet of the heat-absorbing cone and it will be seen therefrom that all the heat of compression is utilized in the generator chamber.

Inasmuch as air pressure has a direct bearing upon combustion—the rate of combustion doubling with the pressure—the air is injected into the generating chamber at as high a temperature as the working conditions will permit and it thereby serves in returning heat units, produced in the air compressor, to the generator chamber with a corresponding increase in efficiency. The compressed air, entering the combustion chamber, is increased to more than double its volume by the heat transmitted to it by the generator, and thereby becomes adapted to perform work additional to that required in compressing it. If now by the introduction of water, the gases in the generating chamber are cooled, the heat efficiency is considerably lowered, but it must be remembered that, inasmuch as in the present method the issuing gases can be utilized at a considerable low temperature, at about 800° Fahrenheit, while the jets are operated at about 3000° Fahrenheit, it can readily be understood that the actual thermal efficiency of the present method is very high, the net result being a considerable gain over the usual type of internal combustion engines and far superior to any steam engine, the reliability and flexibility of which, however, is retained in addition to the elimination of the ignition, carbonation &c. of the gas engines.

The theoretical efficiency of the present method is largely influenced by the quality of fluid, introduced as the heat-absorbing jet. Water is preferably used for this purpose, because it has no bad effect upon the working parts, maintains heat efficiency and, particularly because the combustion of any hydrogen-containing fuel, results in the production of water which may again be utilized in succeeding cycles, and forms one of the most important and distinctive features of the present method. A moderate supply of water is only required and, as a matter of fact, at the end of a period of operations under the present method, there should be more water in the machine than there was at the start.

The expansive gases produced in the generator, are directly led from there to the cylinder of an engine or other prime mover or they may be used for heating purposes, for which otherwise heated steam is used, such as in heating of houses, steam tables &c.

They consist mostly of carbon dioxid and nitrogen, mixed with highly superheated aqueous vapor. It is evident that the methods, forming the subject-matter of the present inventions, may be used in connection with any ordinary type of engine, pump or motor. Since one of the main objects of these methods is the utilization of heat units and the prevention of waste, the exhaust gases and vapors, leaving the engine or other device of utilization, are suitably controlled and led to a condenser, where the vapors are condensed and returned to the generator, while the noncondensable gases, carbon dioxygen and nitrogen, for instance, escape into the atmosphere.

The water, formed in the condenser, is conveyed by gravity or otherwise, to the air compressor and is there atomized by the incoming air, absorbs the heat, developed on the heat compression stroke and is then again changed to steam. The air also carries the water which has condensed, after leaving the compressor and which has not vaporized in the compressor, through a suitable trap or separator, where the bulk of it is separated from the air, while the small amount of vapor, passing through with the air, will again be utilized in the heat-generating and heat-absorbing cones. The water from the separator is forced into the water jacket of the generator, heated therein and passed off into the generator chamber by means of the nozzle of the heat-absorbing cone, while, similarly, the fuel is pumped from the fuel reservoir into the generator by means of the nozzle of the heat-generating cone. In the generator chamber, the fuel jet once ignited burns continuously, the water jet enters continuously from the opposite nozzle, mingling with and cooling the products of combustion and forming a highly expansive body which is conducted to an engine or other device, where it performs its work and again enters the condenser to be prepared for another continuous cycle of ignition, combustion, expansion, propulsion, exhaust and condensation, utilizing a maximum of heat units to the greatest advantage as hereinbefore already set forth.

One form of an apparatus for employing the present invention is illustrated in Figs. 8 and 9 shown as secured to a side wall A, by means of the wall base plate B, and the screw bolts C, and comprises an air compressor 1, a condenser 2, having an exhaust pipe 3, communicating with the atmosphere, and a connecting pipe 4, leading from the condenser to the inlet valve of the compressor. The compressor is connected by a pipe line 5 to an air receiver 6.

A fuel tank 7 contains the necessary oil, petroleum, etc. and a water tank 8 a suitable supply of water, which both are led to a suitable generator, indicated at 9, by means of a pipe line 10 establishing connection between the generator and the fuel tank, and another pipe line 11, between the generator and the water tank. A water nozzle, the inlet for the heat-absorbing jet, is shown at 12 and a fuel nozzle, the inlet for the heat-generating jet, at 13. A valve 14, on top of the generator 9 may be used as starting and igniting means and is opened by hand, to let the products of combustion escape into the open air, until the fuel jet is fully started. A valve 15 in the pipe 16 controls the supply of compressed air from the air receiver 6 to the water nozzle 12 and a similar valve 17 in the pipe 18 the supply of air to the fuel nozzle 13.

The fuel jet side of the generator is provided with a water jacket 19, which receives its water through the pipe line 11 and gives it off to the water jet through the nozzle 12. The water jet side of the generator is provided with a heat insulating filling 20. The purpose of the water jacket is to absorb the heat of combustion, while that of the insulating filling is to prevent loss of heat by radiation. An electric spark or igniting plug 21 may be arranged on the generator instead of the valve 14, for igniting the fuel jet and a hand operated air pump 22 may be used to establish the initial air pressure in the air receiver.

The motive fluids produced in the generator are carried off, by means of a main 23 (wherein is placed a reducing valve 23ª), which is by-passed at 24 to the air compressor, and receives back the part of the motive fluids, used in the compressor, through the pipe 25. A pipe line 26 finally supplies the motive fluids to a prime mover 27, where they are utilized and exhausted through the pipe 28 to the condenser 2.

The operation of an apparatus for carrying out the methods for generating and utilizing motive fluids, such as illustrated in Figs. 8 and 9, is as follows:—

Assuming that the apparatus has not yet been used, water is admitted to the water jacket 19 of the generator 9 from the water reservoir 8 through the pipes 11. The hand air pump 22 is then started and air under pressure supplied to the air receiver 6. Fuel is supplied from the fuel reservoir 7 through the pipe 10 to the fuel nozzle 13, the valve 17 in the pipe 18 is then opened and with the valve 14 open, air supplied to the fuel nozzle, causing the fuel to enter the generator, finely divided and atomized, wherein it is ignited by means of the spark plug 21.

After the flame of the fuel nozzle is fully started and regulated, the valve 15 in the pipe 16 is opened and compressed air is supplied to the water nozzle 12, causing a finely divided spray of water to oppose and impact upon the flame of the fuel nozzle. Compressed air is still supplied by hand until the two opposing cones, the heat-generating jet of the fuel nozzle and the heat-absorbing jet of the water nozzle, are fully developed and properly adjusted, whereupon the valve 14 is closed.

The pressure of the motive fluids, now generated in the generator, rises slowly until it is sufficient to pass through the main 23 and the by-pass 24 to the compressor 1 and to operate the same, from which time, the operation of the entire apparatus becomes entirely automatic. The pressure in the generator increases further until it is capable to operate the prime mover 27, wherein the motive fluids are utilized, giving off their exhaust gases to the condenser 2, where the aqueous constituents are cooled and transformed into water for renewed use, while the carbon dioxid and nitrogen escape into the atmosphere, in this manner completing the entire cycle of operation, the essence of the present invention.

Claims:

1. The method of generating motive fluids which consists in opposing in a confined space, currents under pressure, of heat generating fluids aided in, and heat absorbing fluids refrained from dispersing heat.

2. The method of generating motive fluids which consists in directing a current of combustible fluid aided in dispersing heat, against a current of expansible fluid refrained from dispersing heat, and causing combustion of the commingling fluids.

3. The method of generating motive fluids which consists in directing a current of combustible fluid aided in dispersing heat, against a current of expansible fluid refrained from dispersing heat, causing combustion of the commingling fluids, and utilizing the products of said combustion.

4. The method of generating motive fluids which consists in separately atomizing heat generating and heat absorbing materials, aiding said heat generating materials in and refraining said heat absorbing materials from dispersing heat, and causing said materials to contact under pressure at temperature of combustion.

5. The method of generating motive fluids which consists in separately atomizing heat generating and heat absorbing materials, aiding said heat generating materials in and refraining said heat absorbing materials from dispersing heat, causing said materials to contact under pressure at temperature of combustion, and utilizing the products of said combustion.

6. The method of generating motive fluids, which consists in opposing in a confined space a jet of inflammable material in a state of combustion to a jet of heat-absorbing material, utilizing the fluids so obtained, condensing the aqueous products of combustion from said fluids, and returning the same to said jet of heat-absorbing material.

7. The method of generating motive fluids which consists in opposing in a confined space a jet of inflammable material in a state of combustion to a jet of heat absorbing material, aiding said jet of inflammable material in and refraining said jet of heat absorbing material from dispersing heat, utilizing the products so obtained, condensing the aqueous constituents thereof, and returning the same to said jet of heat absorbing material.

8. The method of generating motive fluids which consists in opposing in a confined space, currents under pressure, of heat generating fluids aided in dispersing heat, and heat absorbing fluids refrained from dispersing heat, causing combustion of the commingling fluids, utilizing the products of said combustion, condensing the aqueous constituents thereof, and returning the same to said current of heat absorbing fluids.

9. The method of generating motive fluids which consists in opposing in a confined space two or more currents of heated fluids containing oxygen-bearing material, one or more of said currents being in a state of combustion and aided in dispersing heat, said currents meeting in a plane of impact of an area less than that of said confined space in said plane.

10. The method of generating motive fluids which consists in causing combustion in a confined space of opposing jets of similar area of impact, of heat generating and heat absorbing fluids under pressure, simultaneously therewith preheating said heat absorbing fluids by the ignited jet of said heat generating fluids, and then utilizing the products of combustion for the translation of energy.

11. The method of generating motive fluids which consists in projecting into a confined space, opposing jets under pressure of fluids containing oxygen bearing materials, one of said jets in a state of combustion impacting upon the other, the latter consisting in part of products of combustion formed by a previous impact of said jets.

12. The method of generating motive fluids which consists in projecting into a confined space from opposite directions heat-generating and heat-absorbing cones, the axes of said cones coinciding with that of said space, and the area of impact of said cones being less than that of said confined space in said plane of impact, conveying off the fluids produced by said impact to utilize the same, condensing the aqueous constituents from said fluids, and returning the same to said heat-absorbing cone.

13. The method of generating motive fluids which consists in opposing in a confined space, currents under pressure of heat generating and heat absorbing fluids, causing combustion of the commingling fluids, leading off the products of combustion, bypassing a portion thereof for the translation of energy to cause said pressure, returning said by-passed portion to the remaining portion, and then utilizing both portions for the translation of energy.

14. The method of generating motive fluids which consists in opposing in a confined space, currents under pressure of heat generating and heat absorbing fluids, causing combustion of the commingling fluids, leading off the products of combustion, bypassing a portion thereof for the translation of energy to cause said pressure, returning said by-passed portion to the remaining portion, utilizing both portions for the translation of energy, condensing the aqueous constituents of the united portions, and returning the same to said current of heat absorbing fluids.

15. The method of generating motive fluids which consists in opposing in a confined space, currents under pressure and of substantially equal area of impact, of heat generating and heat absorbing fluids, the first aided in and the latter refrained from dispersing heat.

16. The method of generating motive fluids which consists in directing a current of combustible fluid against a current of expansible fluid, the first aided in and the latter refrained from dispersing heat, both currents meeting with substantially equal area in the plane of impact, and subjecting the commingling fluids to the action of combustion.

17. The method of generating motive fluids which consists in separately atomizing heat generating and heat absorbing materials, the first aided in and the latter refrained from dispersing heat, and causing said atomized materials to contact with substantially equal area under pressure in a plane of impact and at temperature of combustion.

18. The method of generating motive fluids which consists in separately atomizing heat generating and heat absorbing materials, the first aided in and the latter refrained from dispersing heat, causing currents of said materials to impact upon each other with substantially equal area in a confined space, and maintaining in said space temperature of combustion.

19. The method of generating motive fluids which consists in opposing in a confined space a jet of inflammable material in a state of combustion to a jet of heat absorbing material, the first aided in and the latter refrained from dispersing heat, said jets meeting with substantially equal area of impact, and conveying off the fluids so obtained to a point of utilization.

20. The method of generating motive fluids which consists in opposing in a confined space, currents under pressure of heat generating and heat absorbing fluids, utilizing the resulting fluids, condensing the aqueous constituents thereof, and returning the same to said confined space.

21. The method of generating motive fluids which consists in opposing in a confined space, currents under pressure, of heat generating fluids aided in, and heat absorbing fluids containing hydrogen and oxygen in a proportion to form water, and refrained from dispersing heat.

22. The method of generating motive fluids which consists in directing a current of combustible fluid aided in dispersing heat, against a current of expansible fluid containing hydrogen and oxygen in a proportion to form water, and refrained from dispersing heat, and causing combustion of the commingling fluids.

23. The method of generating motive fluids which consists in separately atomizing heat generating materials and heat absorbing materials containing hydrogen and oxygen in a proportion to form water, aiding said heat generating materials in and refraining said heat absorbing materials from dispersing heat, causing said materials to contact under pressure at temperature of combustion, and utilizing the products of said combustion.

24. The method of generating motive fluids which consists in opposing in a confined space currents under pressure, of heat generating and heat absorbing fluids, causing combustion of the commingling fluids, leading off the products of combustion, bypassing a portion thereof for the translation of energy to cause said pressure, and utilizing the remaining portion for the translation of energy for other purposes.

25. The method of generating motive fluids which consists in opposing in a confined space currents under pressure, of heat generating and heat absorbing fluids, causing combustion of the commingling fluids, leading off the products of combustion for the translation of energy to cause said pressure and thereafter utilizing said products of combustion for the translation of energy for other purposes.

26. The method of generating motive fluids which consists in opposing in a confined space currents under pressure of heat generating and heat absorbing fluids, causing combustion of the commingling fluids, leading off the products of combustion for the translation of energy to cause said pressure, and then utilizing them for the translation of energy for other purposes, condensing the aqueous constituents of the remaining products of combustion and returning the same to said current of heat absorbing fluids.

In witness whereof the inventors have hereunto set their hands in the presence of two subscribing witnesses, at Philadelphia, in the county of Philadelphia and State of Pennsylvania, this 10th day of June, 1912.

EDWIN TAYLOR.
WILLIAM H. TAYLOR.

In presence of—
P. S. PARISH,
THEO. H. M'CALLA.